Aug. 15, 1933.  F. K. KILIAN  1,922,099
CASTER FOR FURNITURE AND THE LIKE
Filed July 17, 1931  2 Sheets-Sheet 1
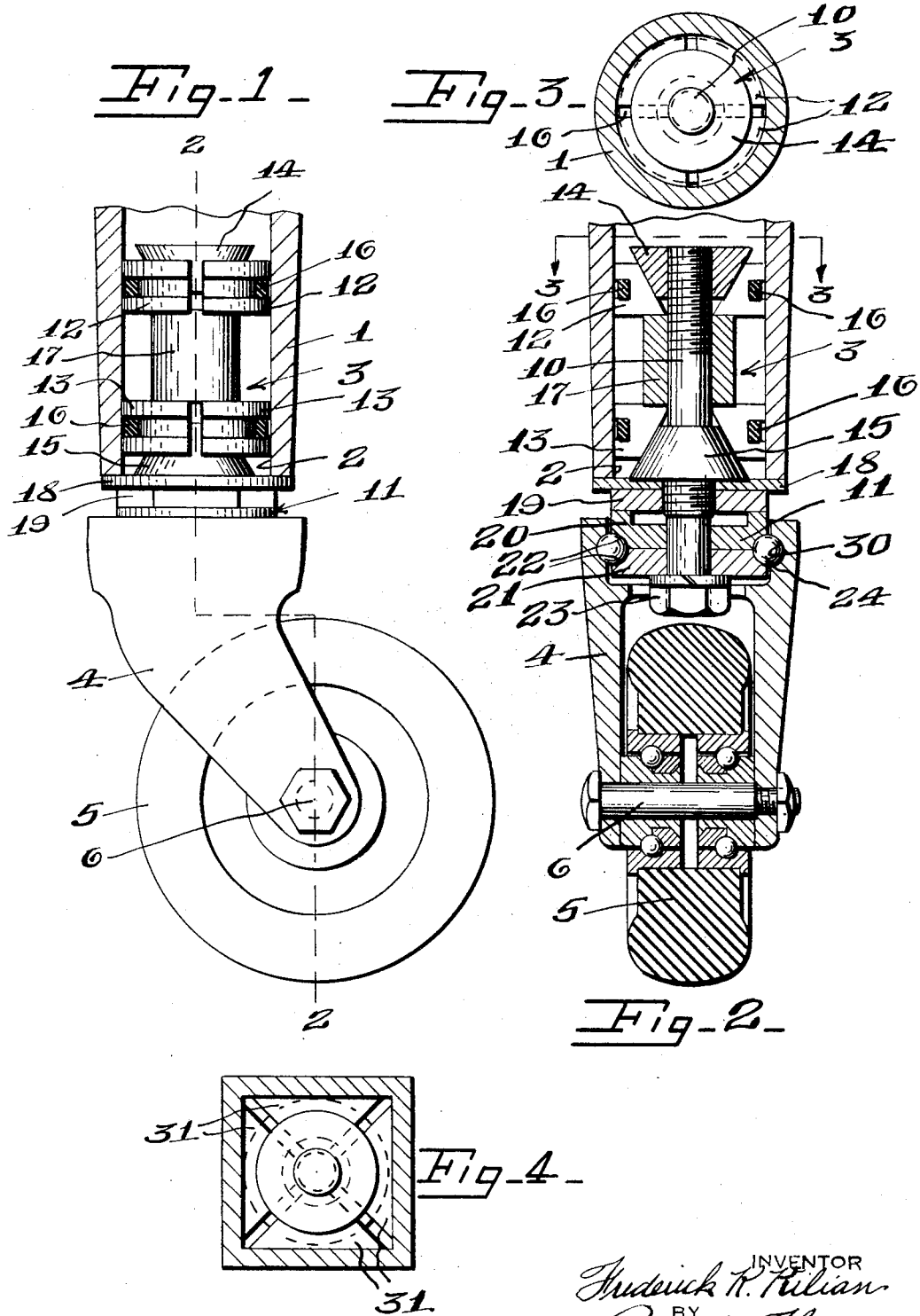

Aug. 15, 1933. F. K. KILIAN 1,922,099
CASTER FOR FURNITURE AND THE LIKE
Filed July 17, 1931 2 Sheets-Sheet 2
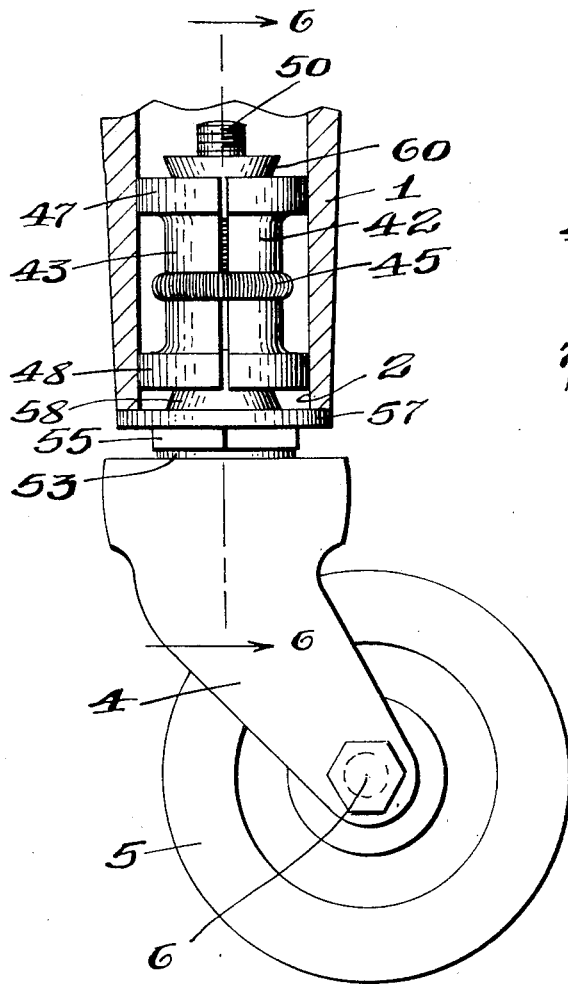
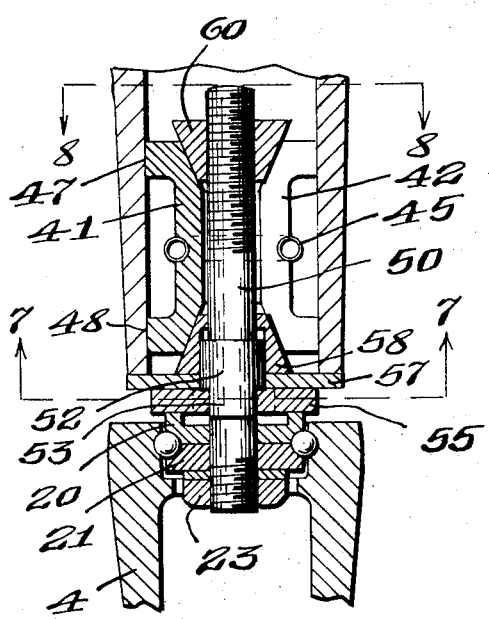
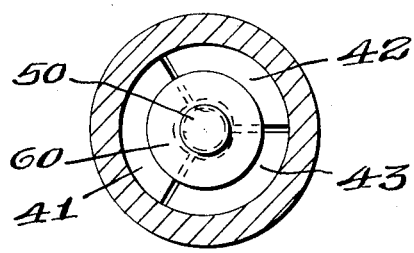
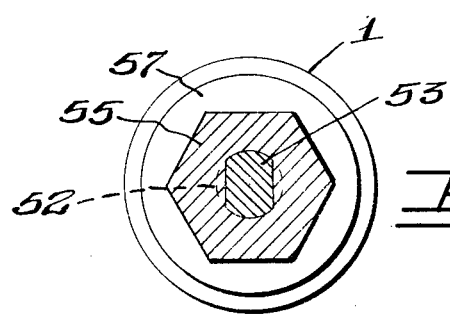
INVENTOR.
Frederich K. Kilian
BY
Bodell & Thompson
ATTORNEYS.

Patented Aug. 15, 1933

1,922,099

UNITED STATES PATENT OFFICE 1,922,099

CASTER FOR FURNITURE AND THE LIKE

Frederick K. Kilian, Syracuse, N. Y.

Application July 17, 1931. Serial No. 551,342

1 Claim. (Cl. 16—38)

This invention relates to caster wheels for articles of furniture and analogous purposes, and has for its object, a particularly simple and efficient expander and operating means therefor for firmly securing the caster wheel in the leg, or other part, of the article to which the caster wheel is applied.

A further object of the invention is to provide a shank for a caster which may be expanded to engage the wall of a socket in the leg of an article of furniture. A further object is to devise such a shank which is capable of sufficient expansive movement so that it may be made to fit various sizes of sockets such as met with particularly in metal furniture which is generally constructed with hollow legs.

Other objects and advantages of the invention will appear and will be pointed out as the description proceeds.

The invention consists in the novel features and in the combinations and constructions hereinafter set forth and claimed.

In describing this invention, reference is had to the accompanying drawings, in which like characters designate corresponding parts in all the views.

Figure 1 is a side elevation of one embodiment of this invention, the contiguous portion of a leg of an article of furniture, as the leg of a bed, being shown in section.

Figure 2 is a sectional view on line 2—2, Figure 1.

Figure 3 is a sectional view on line 3—3, Figure 2.

Figure 4 is a view, similar to Figure 3, showing a modification of the expansible means for use with a square, or noncircular socket.

Figure 5 is a side elevation, partly in section, showing a modified form of the invention.

Figure 6 is a section along the line 6—6 of Figure 5.

Figure 7 is a section along the line 7—7 of Figure 6.

Figure 8 is a section along the line 8—8 of Figure 6.

This caster comprises generally, a shank, a wheel support, or a fork at the lower end of the shank, a caster wheel carried by the fork, the shank comprising a stem for extending into the socket in the leg of a piece of furniture, expansible means around the shank for coacting with the inner wall of said socket, and an expander operable by movement of the stem.

1 designates the leg, or other part, of a piece of furniture, formed hollow, or with a socket 2 opening through its lower end. The numeral 3 designates the shank as a whole, 4 the wheel support or fork at the lower end of the shank, and 5 the caster wheel mounted on a suitable axis 6 carried by the fork. The fork 4 is preferably mounted on the shank to have a swiveling action. The shank 3 comprises a stem 10 extending into the socket 2 and has a head 11 at its lower end to which the fork is swiveled.

In the illustrated embodiment there are a plurality of expansible members spaced apart along the stem. 12 designates the upper expansible member, and 13 the lower expansible member. These are operated by expanders on the stem 10. These expanders are here shown as upper and lower conical and oppositely disposed wedges on the stem 10. 14 designates the upper wedge which threads on the upper end of the stem, the conical service thereof coacting with the upper expansible member 12. 15 designates the lower wedge which is fixed to the stem 1 and coacts with the lower expansible member 13, it being usually formed integral with the stem.

In the form shown in Figures 1, 2 and 3, each of the expansible members 12 and 13 consists of two arcuate or nearly semi-circular sections or shoes which are held together or against the companion wedge by an elastic ring 16 located in grooves in the sections or shoes, this elastic ring being usually a rubber band. A spacer 17 is interposed between the upper and lower expansible members for transferring the thrust or axial movement of one to the other.

Preferably, the stem 10 is operated by turning it to tighten or loosen the wedges. For instance, turning of the stem in one direction causes it to turn in the upper wedge 14 which is threaded on the stem, and as the stem is held from endwise movement, as will be presently described, the wedge will be moved along the stem expanding and also thrusting downwardly the upper expansible member 12, and the thrusting movement will be transferred through the spacer 17 to the lower expansible member 13 thrusting it axially of the conical wedge 15 which is oppositely disposed relatively to the wedge 14, thus causing the lower expansible member 13 to also expand.

The head 11 at the lower end of the stem 10 comprises an abutment 18 or thrusting against the lower edge of the lower wedge 15, and the lower edge of the leg 1, a nut 19 threading on the stem against the abutment 18, a bearing consisting of separable disks 20, 21 enclosing a peripheral ball raceway 22, and a nut 23 threading on the lower end of the stem against the bearing. Thus, the stem, abutment 18, nut 19, nut 23, and the bearing are practically one unit. The fork or wheel support is formed with an internal raceway 30 complemental to the raceway 22, and balls 24 are located in the raceways. The fork is thus connected to the shank by a swivel joint.

In assembling, the abutment 18 and nut 19 are placed in position on the stem with the abutment against the wedge 15, which is fixed to the stem. The lower raceway disk 21 is then placed in the wheel support, the balls dropped into position, and then the upper raceway disk 20 placed on the lower. The wheel support with the raceways and balls are then placed on the lower end of the stem 10 and the nut 23 applied, thus clamping the raceway disks 21, 20, nut 19, abutment 18 together against the wedge 15. The lower expansible member 13, spacer 17, upper expansible member 12 are then placed on the stem in order, and the upper wedge 14 threaded down on the stem. When the caster wheel mounting is applied to the leg of a piece of furniture, the wedge 14 is turned on the stem 10 until the expansible members 12, 13 will slide with a close sliding fit into the socket 2 of the piece of furniture, and then, the expansible members 12, 13 are snugly wedged into engagement with the inner wall of the socket to prevent falling out of the shank of the caster, by turning the nut 19. When the nut 19 is turned, the stem 10, and head 11, wedge 15, abutment 18 turn as a unit therewith, and as the stem is turned its upper threaded end turns in the upper wedge 14, which is held from turning by reason of its engagement with the expansible members 12 and hence, during the turning of the stem, the upper wedge 14 will be pulled downwardly, and the thrust transferred through the spacer 17 to the lower wedge member 13 forcing it downwardly on the wedge 15, and during such movements the expansible members will be expanded into snug engagement with the walls of the socket 2.

In Figure 4 of this invention, it is shown as applied to a hollow non-circular or square socket wherein the expansible members are triangular blocks 31 coacting with the wedge members similar to the wedge members 14 and 15 at the apexes of the triangular box, the bases of the triangular box thrusting against the inner faces of the walls of the square post. These blocks are held assembled by an elastic band encircling them, similar to the band 16.

Figure 5 shows a modified form of the invention. In this form of the invention three expander members 41, 42 and 43 are held in assembled position by a coiled spring 45 having its ends connected. The expander members are preferably provided with a groove for receiving the spring 45 and holding the spring against displacement. This construction is illustrated in Figure 6.

Each expander member is formed with an enlarged section at its upper and lower ends to provide the bearing surfaces 47 and 48 respectively. These bearing surfaces contact with the socket in the article of furniture.

If the bearing surfaces of the expander are substantially circular when the expander is in contracted position, it is obvious that each of the expander members will have a line contact only when the device is expanded to grip the sides of a socket.

One advantage in using three expander members is the fact that the expander will contact firmly at three points on the inside of the socket while an expander having contact at four points may not make a firm contact. This principle is illustrated in the case of a three-legged stool, all of the legs of which will touch the ground no matter how uneven the surface may be, while a chair with four legs is often unsteady on a comparatively level floor. If the expander has two points of contact only it does not hold the stem against rocking movement about an axis passing through the two points of contact.

A stem 50 is formed with a collar 52. The stem 50 is of cylindrical form except for a short intermediate section 53 which is preferably flattened on two sides so that a hexagonal washer 55 may be inserted over the section 53. The hexagonal washer 55 contacts with the lower shoulder provided by the collar 52.

The washer 55 is hexagonal in form so that a wrench may be used to turn the same, and due to a non-circular hole in the washer 55 which fits over the section 53 of the stem 50, turning of the washer 55 will cause the stem 50 to also turn.

Raceway discs 20 and 21 are clamped between the washer 55 and the nut 23 which threads on the lower end of the stem 50 in the same manner described in connection with Figure 2. The construction of the ball bearing assembly below the washer 55 is exactly the same in Figure 6 as in the form of the invention previously described in connection with Figure 2.

A washer 57 is mounted on the collar 52 and in contact with the hexagonal washer 55. This washer 57 serves as a cover to close the open end of the socket 2 and may be round or square depending on the shape of the leg of the article of furniture.

A conical wedge member 58 is slidably mounted on the stem 50 and contacts with the washer 57. An upper conical wedge member 60 is threaded on the upper end of the stem 50. The expander members 41, 42 and 43 are provided with inclined inner faces which are complemental to the faces of the conical wedge members 58 and 60.

When the device is assembled as shown in Figure 6 and the hexagonal washer 55 is turned by means of a wrench or other suitable tool, the stem 50 will be forced to turn and will draw the conical wedge member 60 downwardly thereby forcing the expander members 41, 42 and 43 outwardly against the sides of the socket 2. When expanding the device by turning the hexagonal washer 55 it is necessary that one of the expander members be in contact with the side of the socket and with the conical wedge member 60 so that some friction will be provided to prevent the conical wedge member 60 from turning with the stem 50 and thus not screwing downwardly on the stem. Very little friction is required and even a very light contact between one of the expander members and the conical wedge member 60 is sufficient to hold the conical wedge member against turning with the stem 50.

From the foregoing description it will be apparent that I have provided an expander device by which a caster may be secured in the leg of an article of furniture, the same expander device being adjustable to secure the caster in legs having sockets of various sizes. The preferred embodiments of the invention are illustrated but changes and modifications may be made without departing from the spirit of the invention as set forth in the appended claim.

What I claim is:

In a caster wheel for furniture and the like, the combination with a member formed with a socket, of a stem extending into the socket and threaded at its upper end and having a lower wedge member secured thereto intermediate of its ends at the lower end of the socket, an upper complemental wedge member threaded on the upper end of the stem, expansible means between the stem and the inner wall of the socket and operated by the wedge members for engaging the inner wall of the socket, an abutment which is a separable piece from the stem mounted on the stem at the lower end of the socket and coacting with the open end of the socket to form a closure therefor, said abutment being separable from, and thrusting against the lower wedge member, means on the stem for turning it to tighten and loosen the wedge members, said means thrusting against the abutment, a wheel support swivelly mounted on the lower end of the stem below said means and including upper and lower washers formed with raceways in their peripheries for receiving balls which coact with complemental raceways in the support, the upper washer thrusting against said means and a shoulder on the stem thrusting against the lower washer, whereby upon turning of the stem by said means, the abutment thrusting against the end of the socket and said means thrusting against the swivel bearing, the upper wedge member is moved relatively to the lower.

FREDERICK K. KILIAN.